No. 764,491. PATENTED JULY 5, 1904.
B. C. NEWLOVE.
PIPE STAND.
APPLICATION FILED MAR. 25, 1903.
NO MODEL.
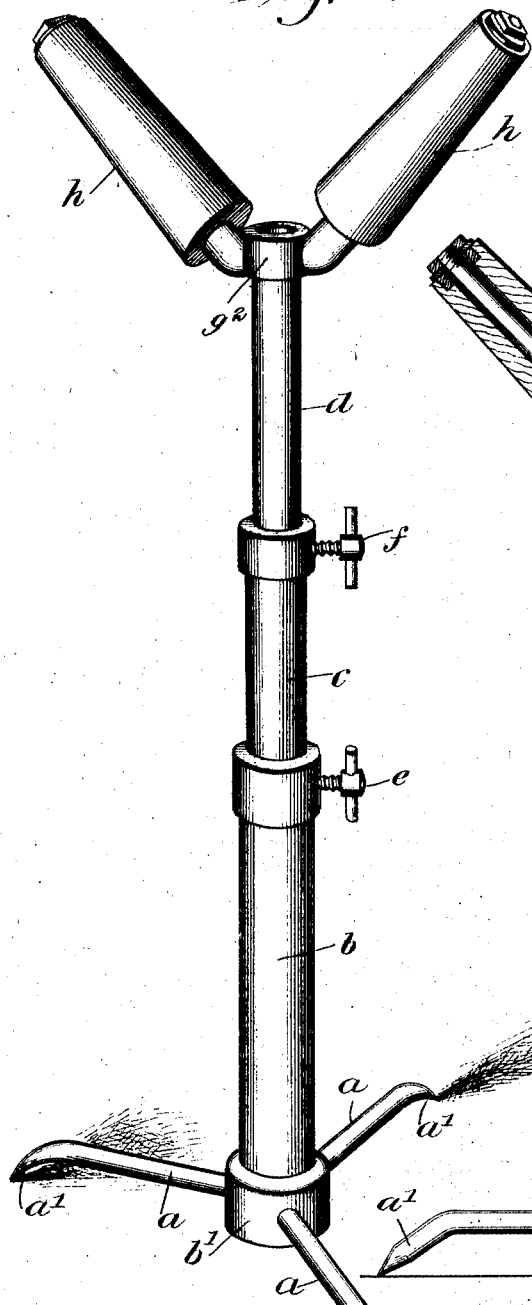
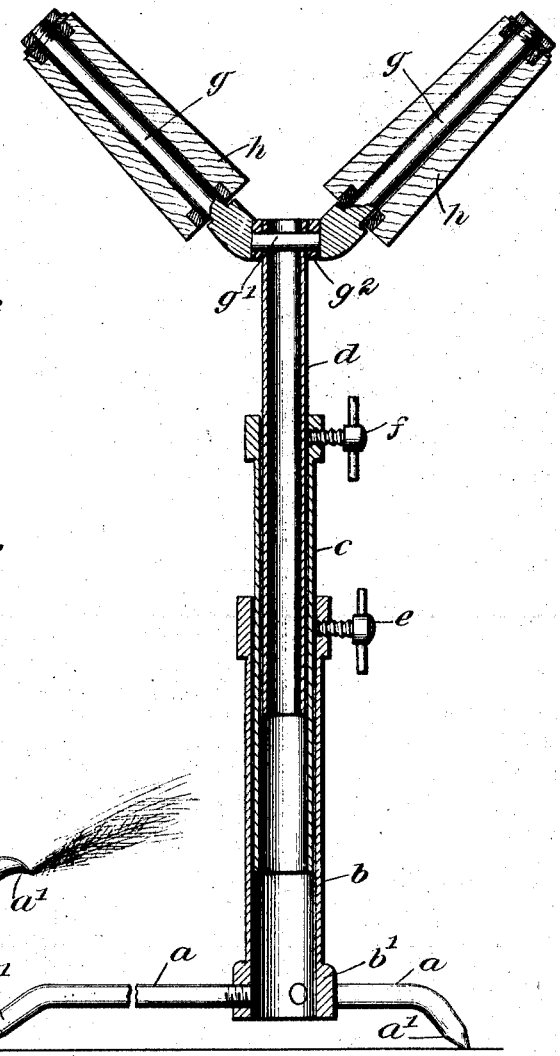
WITNESSES
INVENTOR
Benjamin C. Newlove
BY
ATTORNEYS.

No. 764,491. Patented July 5, 1904.

UNITED STATES PATENT OFFICE.

BENJAMIN CARTER NEWLOVE, OF WALSENBURG, COLORADO.

PIPE-STAND.

SPECIFICATION forming part of Letters Patent No. 764,491, dated July 5, 1904.

Application filed March 25, 1903. Serial No. 149,566. (No model.)

*To all whom it may concern:*

Be it known that I, BENJAMIN CARTER NEWLOVE, a citizen of the United States, and a resident of Walsenburg, in the county of Huerfano and State of Colorado, have invented a new and Improved Pipe-Stand, of which the following is a full, clear, and exact description.

The special purpose of this invention is to provide means for supporting the outer end of a pipe while work is being done on the inner or opposite end. Such means to be practically effective must be stable, admit of easily shifting of the pipe in longitudinal directions, and of easy adjustment with respect to the height at which the pipe is held. These requirements are fully answered in the structure forming the subject of my invention, which consists, briefly stated, in a base, a column, the length of which may be adjusted at will, and in a head, on which the pipe is supported to move freely longitudinally, these parts having special structure, all as will be hereinafter set forth.

This specification is an exact description of one example of my invention, while the claim defines the actual scope thereof.

Reference is to be had to the accompanying drawings, forming a part of this specification, in which similar characters of reference indicate corresponding parts in both views.

Figure 1 is a perspective view of the invention, and Fig. 2 is a longitudinal section thereof.

The base of the stand as here illustrated is formed of a number (preferably three) of legs $a$, which have their ends $a'$ pointed and turned downward, so as securely to engage the supporting-surface. These legs are fastened to the reinforced lower end $b'$ of the bottom section $b$ of the column. Said column is formed of two other sections $c$ and $d$, all of said sections $b$, $c$, and $d$ being tubular and fitted telescopically the one within the other. At the upper ends of the sections $b$ and $c$ clamping-screws $e$ and $f$ are located, these screws working, respectively, with the sections $c$ and $d$, and by this arrangement the length of the column may be regulated at will, and after the clamping-screws are tightened into position a thoroughly rigid structure is attained.

The head $g^2$ of the stand carries two diagonally-extending limbs $g$, fastened rigidly by brazing or otherwise to the head, and said head is secured to the upper end of the section $d$ of the stand by means of a transverse connecting-pin $g'$ or by any other suitable connecting device. To said limbs $g$ are connected rollers $h$, which turn freely around the same and provide surfaces which are engaged with the pipe. These rollers $h$ standing as described form a fork between which the pipe is placed, and said rollers permit of the free longitudinal shifting of the pipe, as referred to hereinbefore.

The uses of the invention will be fully understood by persons skilled in the art. It is sufficient for me to say that when the device is employed in the manufacture or other work on sheet-metal tubing when the work is being done at one end of the tube said end is placed on the horn or bench and the outer end rested on the stand. This avoids the necessity of a boy being employed to hold the opposite end of the pipe, it having been previously the almost general custom to employ a boy for this work.

Various changes in the form, proportions, and minor details of my invention may be resorted to at will without departing from the spirit and scope thereof. Hence I consider myself entitled to all such variations as may lie within the intent of my claim.

Having thus described my invention, I claim as new and desire to secure by Letters Patent—

A pipe-stand, comprising a base, a vertically-adjustable column mounted thereon, a head, means for attaching the head to the upper end of the column, two limbs mounted on the head and projecting out from opposite sides thereof, and rollers mounted to turn freely on the limbs and covering the major portions thereof.

In testimony whereof I have signed my name to this specification in the presence of two subscribing witnesses.

BENJAMIN CARTER NEWLOVE.

Witnesses:
HENRY SNEDDEN,
JESSIE L. THOMPSON.